United States Patent
Yunoki

[11] Patent Number: 6,097,874
[45] Date of Patent: Aug. 1, 2000

[54] OPTICAL ATTENUATOR

[75] Inventor: Shuichi Yunoki, Tokyo, Japan

[73] Assignee: NEC Corporation, Tokyo, Japan

[21] Appl. No.: 09/010,445

[22] Filed: Jan. 22, 1998

[30] Foreign Application Priority Data

Jan. 28, 1997 [JP] Japan ................................. 9-014284

[51] Int. Cl.⁷ .................................................. G02B 6/00
[52] U.S. Cl. ................................................ 385/140; 385/142
[58] Field of Search ..................................... 385/140, 142

[56] References Cited

FOREIGN PATENT DOCUMENTS

| | | |
|---|---|---|
| 88304182 | 5/1988 | European Pat. Off. . |
| 0 692 722 | 1/1996 | European Pat. Off. . |
| 0 692 722 A 2 | 1/1996 | European Pat. Off. . |
| 42 37 735 A 1 | 1/1994 | Germany . |
| 54-2754 | 1/1979 | Japan . |
| 61-19001 | 5/1986 | Japan . |
| 63-96506 | 6/1988 | Japan . |
| 63-313102 | 12/1988 | Japan . |
| 2-117503 | 9/1990 | Japan . |
| 15002/93 | 2/1993 | Japan . |
| 5-15002 | 2/1993 | Japan . |

*Primary Examiner*—Teresa M. Arroyo
*Assistant Examiner*—Robert E. Wise
*Attorney, Agent, or Firm*—Whitham, Curtis & Whitham

[57] ABSTRACT

An optical attenuator is provided with a metal-doped optical fiber having a core doped with a transition metal that absorbs light, and a connector that connects this metal-doped optical fiber to an outside transmission line. The core is doped with a transition metal so as to have a uniform rate of attenuation per unit of length. The amount of attenuation may thus be controlled by setting the length of the optical fiber containing this core. The construction adopted for the connector may be fused splicing, mechanical splicing, or optical connection. A transition metal is doped in the core at a uniform concentration. This optical attenuator may also be provided with an exchange section for switching among a plurality of metal-doped optical fibers having mutually differing lengths. Only one type of metal-doped fiber need be produced, and the fiber is used by varying its length.

8 Claims, 1 Drawing Sheet he present invention relates to an optical attenuator, and particularly to an optical attenuator that uses a metal-doped optical fiber.

OPTICAL ATTENUATOR

BACKGROUND OF THE INVENTION

1. Filed of the Invention

The present invention relates to an optical attenuator, and particularly to an optical attenuator that uses a metal-doped optical fiber.

2. Description of the Related Art

FIG. 1 shows one example of an optical attenuator of the prior art in which a metal thin-film is used. In this device, metal evaporation film 7 is sandwiched and bonded between the junction surfaces of two ferrules 5 that are ground to an angle. Two optical fibers 6 are received in the ferrules. Light that is propagated through optical fiber 6 is attenuated by metal evaporation film 7.

An attenuator for optical fiber made up of high-loss optical fiber inserted between two optical fibers is described in Japanese Patent Publication No. 19001/86 (Yoshinaga et al.). The core of high-loss optical fiber composed of multi-component glass is colored by exposure to radiation. Light propagated through the optical fiber is attenuated by passage through the high-loss optical fiber.

The attenuation capability of the attenuator generally diminishes with time because the number of color centers that are colored by exposure to radiation diminish with time. Yoshinaga et al., however, have succeeded in producing a core having a stabilized attenuation capability by subjecting the core to a heat treatment at 120° C., whereby the number of color centers does not change.

An optical attenuator using high-concentration optical fiber in which a transition metal is doped is described in Japanese Utility Model Laid-open No. 15002/93 (Iwano et al.). The absorption loss of a high-concentration optical fiber is 100,000 dB/Km or more.

The above-described optical fiber is of a type in which the necessary attenuation is obtained by adjusting the amount of doped metal in the core. Normally, the metal-doped fiber used in an optical attenuator is worked to a particular fixed length. Thus, in this type of optical attenuator, either the amount of metal doping or the amount of exposure to radiation must be adjusted so as to obtain a prescribed level of attenuation within a determined limit of the length of the metal-doped fiber.

An optical attenuator of the prior art that uses the above-described metal evaporation film not only is composed of a large number of parts, but also requires oblique grinding of the surfaces between which the metal evaporation film is interposed. Such an attenuator is therefore particularly time-consuming to assemble and difficult to produce with a high accuracy of attenuation. In addition, any discrepancy between the axes of the optical fibers is difficult to adjust.

The drawbacks of an optical attenuator using metal-doped fibers include not only the difficulties of adjusting the amount of doping of the transition metal and the doped region, but also the accompanying high costs. There is also the problem that the accuracy of attenuation obtained by the device of this type exhibits variation on the order of ±1.5 dB. This problem originates from the structure of this type of optical attenuator that a desired attenuation of an optical fiber core of a certain fixed length is obtained only by adjusting the amount of metal doping to the core.

Providing the desired value of attenuation in this type of optical attenuator necessitates the preparation of optical fibers in advance having amounts of metal dopant that vary according to required levels of attenuation, and then when using the optical attenuator, using the optical fiber that has an attenuation close to the desired level of attenuation. Nevertheless, achieving a desired value with accuracy by varying the amount of metal dopant is generally extremely difficult.

The present invention has the object of providing an optical attenuator having a desired attenuation with accuracy by a simple method, thereby realizing an improvement in the accuracy of attenuation amount as well as an improvement in productivity.

SUMMARY OF THE INVENTION

To solve the above-described problems, the optical attenuator of the present invention includes a metal-doped optical fiber having a core doped with a transition metal that absorbs light, and a connector for effecting connection between this metal-doped optical fiber and an external optical circuit, wherein the core that is doped with a transition metal has a constant rate of attenuation per unit of length, and whereby the amount of attenuation of the optical attenuator is determined as proportionate to the length of the optical fiber containing the core.

The optical attenuator of the present invention thus has a fixed rate of attenuation per unit of length, and the amount of attenuation of the optical attenuator is determined as proportionate to its length. As a result, the present invention not only enables easy and accurate control of the attenuation characteristic of an optical attenuator, but also allows a reduction in the cost of manufacturing an optical attenuator. The length of fiber is easily adjusted, and any level of attenuation can be obtained by merely altering the length of the optical fiber. The optical attenuator of the present invention therefore offers wide applicability, and moreover, enables an improvement in accuracy to as high as ±0.1 dB.

The connector may include a fused splice portion that connects by means of a fused splice, a mechanical splice portion that connects by means of a mechanical splice, or an optical connector.

The core is doped with a transition metal of a fixed concentration, and may be provided with an exchange unit in which a plurality of doped optical fibers of mutually differing lengths are switched.

The transition metal preferably contain at least one of cobalt, nickel, and copper.

In the method of the prior art in which the fiber length is fixed and the amount of metal dopant is adjusted to obtain the necessary attenuation, adjustment of the dopant and of the doped region is complicated, and in addition, fibers in which the amount of dopant is varied to realize a desired amount of attenuation must be prepared in advance for every amount of attenuation necessary. In contrast, the necessary attenuation can be obtained with the optical attenuator of the present invention by merely modifying the fiber length, and the present invention therefore enables wide applicability.

The above and other objects, features, and advantages of the present invention will become apparent from the following description referring to the accompanying drawings which illustrate an example of the present invention.

DETAILED DESCRIPTION OF THE PREFERRED EMBODIMENTS

Details of an embodiment of the present invention are next presented with reference to the accompanying figures.

Figure 1:
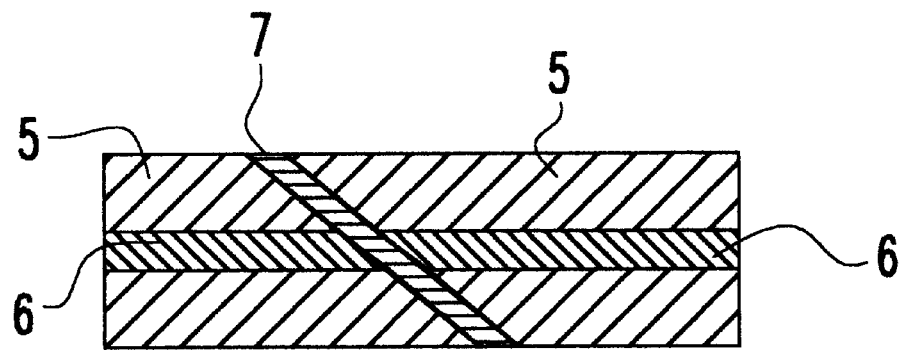
FIG. 1 is a vertical section of an optical attenuator of the prior art.
Figure 2:
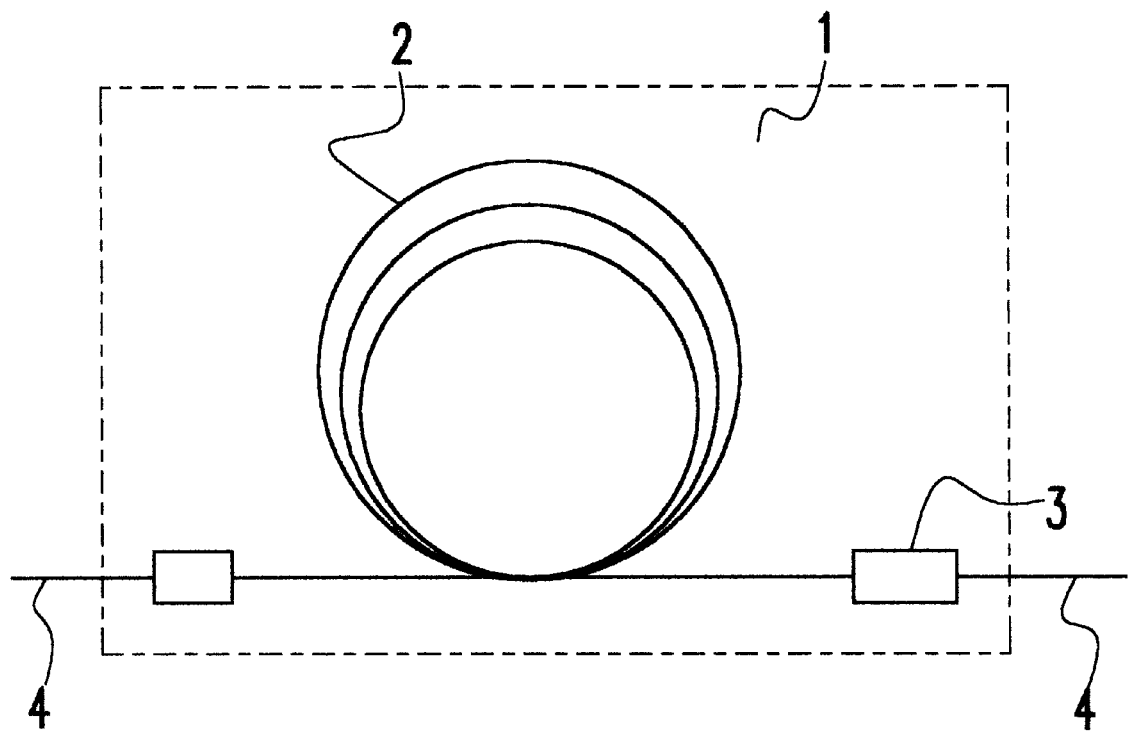
FIG. 2 is a structural view showing one embodiment of the optical attenuator of the present invention.

FIG. 2 shows the construction of one embodiment of the optical attenuator according to the present invention. In FIG. 2, the optical attenuator is provided with optical fiber 2 and optical connector 3. The core of optical fiber 2 is doped with a transition metal that absorbs light such that the rate of optical attenuation is uniform per unit of length. Connector 3 connects optical fiber 4 of the transmission line with optical fiber 2.

In this way, any amount of attenuation can be obtained by freely setting the length of metal doped optical fiber.

The metal employed to dope the metal-doped fiber 2 in the optical attenuator of this invention is preferably cobalt, nickel, or Chromium. The end of this metal-doped fiber 2 is connected to optical fiber 4 of the transmission line by connector 3.

The connection methods that may be employed in connector 3 include connection by fused splicing, connection by mechanical splicing, or an optical connector.

Explanation is next presented regarding the operation of the optical attenuator of this invention.

A necessary amount of attenuation can be obtained by freely setting the fiber length of metal-doped fiber 2 having a fixed rate of attenuation per unit of length. As one example, if doping is effected such that the rate of attenuation of metal-doped fiber 2 is 3 dB/m, a required amount of attenuation of 1.5 dB is obtained by setting the length of metal-doped fiber 2 to 0.5 m. In other words, if the rate of attenuation per unit of length of metal-doped fiber 2 is known, a necessary amount of attenuation can be accurately determined by merely setting the fiber length. In this way, an improvement in the accuracy of the amount of attenuation can be achieved.

In the optical attenuator of the present invention, moreover, any attenuation amount can be obtained in a single optical attenuator device by switching between a plurality of metal-doped optical fibers that are prepared in advance, each fiber being doped with a transition metal at the same concentration but having mutually differing lengths. Again, such a case requires the preparation of a single type of metal-doped optical fiber and then varying the length of this fiber, thereby achieving an improvement in both the productivity of the attenuator as well as the accuracy of the amount of optical attenuation as compared with a construction of the prior art in which the concentration of doping of the transition metal is varied.

It is to be understood, however, that although the characteristics and advantages of the present invention have been set forth in the foregoing description, the disclosure is illustrative only, and changes may be made in the shape, size, and arrangement of the parts within the scope of the appended claims.

What is claimed is:

1. An optical attenuator providing varying levels of attenuation comprising:

a first metal-doped optical fiber of a first chosen length containing a core doped with a transition metal that absorbs light, said core having a uniform rate of attenuation per unit of length, a second metal-doped optical fiber of a second chosen length containing a core doped with a transition metal that absorbs light, said core having substantially the same said rate of attenuation per unit of length as said first metal-doped fiber optic cable, said first chosen length being different from said second chosen length, a means for connecting either said first or said second metal-doped optical fiber to an external optical circuit, and means for substituting said first metal doped optical fiber connected to said external circuit with said second metal doped optical fiber, wherein the amount of attenuation provided by said optical attenuator is proportionate to the length of said metal-doped optical fiber containing said core that is connected to said connecting means.

2. An optical attenuator according to claim 1 wherein said connecting means comprises a fused splice portion that connects by means of a fused splice.

3. An optical attenuator according to claim 1 wherein said connecting means comprises a mechanical splice portion that connects by means of a mechanical splice.

4. An optical attenuator according to claim 1 wherein said connecting means comprises an optical connector.

5. An optical attenuator according to claim 1 wherein said substituting means comprises an exchange unit in which a plurality of said metal-doped optical fibers having mutually differing lengths are included, each of said plurality of said metal-doped optical fibers providing a different level of attenuation based on said differing lengths.

6. An optical attenuator according to claim 1 wherein said transition metal includes at least one of cobalt, nickel, and copper.

7. A method for providing varying levels of optical attenuation, comprising the steps of:

providing a first metal-doped optical fiber of a first chosen length containing a core doped with a transition metal that absorbs light, the core having a uniform rate of attenuation per unit length;

providing a second metal-doped optical fiber of a second chosen length containing a core doped with a transition metal that absorbs light, the core having substantially the same rate of attenuation per unit length as the first metal-doped optical fiber, wherein the length of the first optical fiber is different from the length of the second optical fiber;

connecting the first metal-doped optical fiber to an external optical circuit;

disconnecting the first metal-doped fiber from the external circuit; and connecting to the external circuit the second metal-doped optical fiber, wherein the amount of attenuation is proportionate to the length of the metal-doped optical fiber containing the core that is connected to the external circuit.

8. The method according to claim 7, wherein each of the first and second metal-doped optical fibers are doped with at least one of cobalt, nickel, and copper.

* * * * *